United States Patent [19]

Pelletier

[11] Patent Number: 4,801,119
[45] Date of Patent: Jan. 31, 1989

[54] AWNING SUPPORT FOR RECREATIONAL VEHICLES

[76] Inventor: Ralph W. Pelletier, 200 E. Southern Ave., #110, Apache Junction, Ariz. 85219

[21] Appl. No.: 197,309

[22] Filed: May 23, 1988

[51] Int. Cl.⁴ .............................................. E04G 25/00
[52] U.S. Cl. ................................. 248/354.5; 135/89
[58] Field of Search ............... 248/345, 354.5, 354.1, 248/354.3, 354.4, 273; 160/72, 55, 65, 46, 71, 80; 135/89

[56] References Cited

U.S. PATENT DOCUMENTS

| | | | |
|---|---|---|---|
| 3,612,145 | 10/1971 | Darula | 135/89 |
| 4,117,876 | 10/1978 | Bennett | 135/89 X |
| 4,125,236 | 11/1978 | Landwerlen | 248/640 |
| 4,164,972 | 8/1979 | Bennett | 135/89 X |
| 4,576,192 | 3/1986 | Duda | 135/89 |
| 4,648,573 | 3/1987 | Rubnerth | 248/273 |
| 4,727,897 | 3/1988 | Watts | 135/89 |
| 4,733,683 | 3/1988 | Pozzi | 135/89 |

Primary Examiner—J. Franklin Foss
Attorney, Agent, or Firm—Warren F. B. Lindsley

[57] ABSTRACT

An awning support pole comprising telescopic members which are adjustably positioned for anchoring an awning on the side of a recreational vehicle in an awning extended vehicle parked position and in a second rolled up position when the vehicle is in transit.

3 Claims, 2 Drawing Sheets

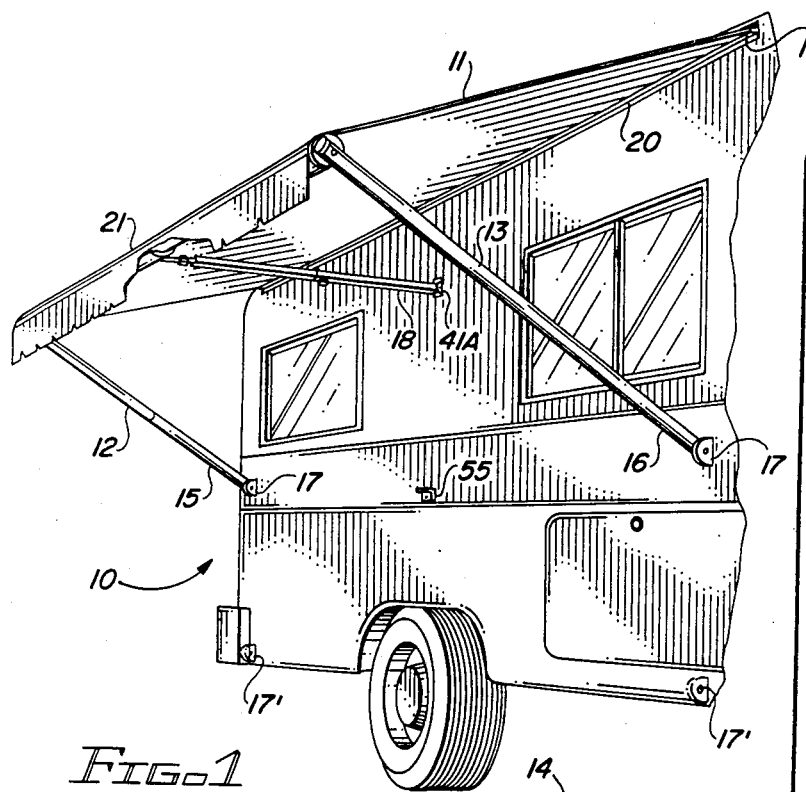
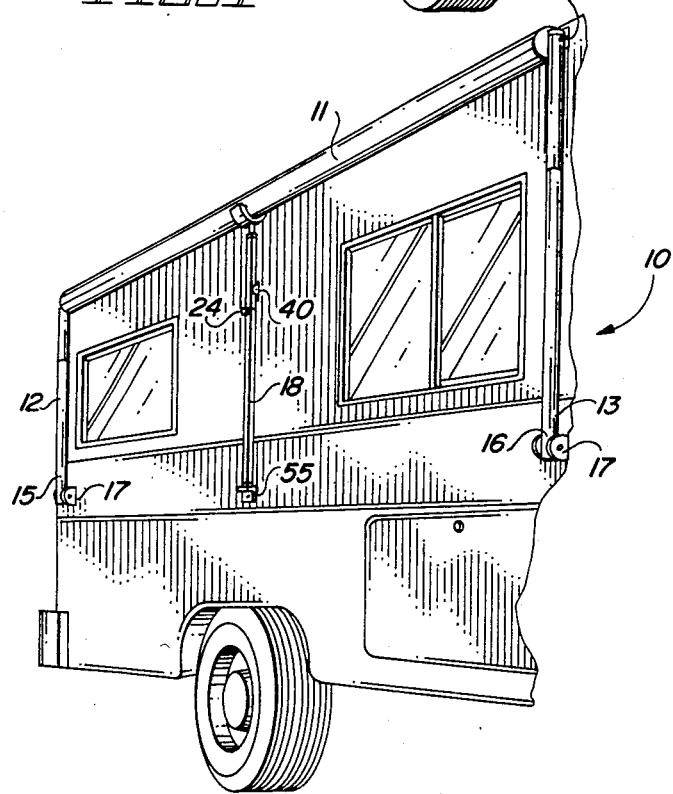
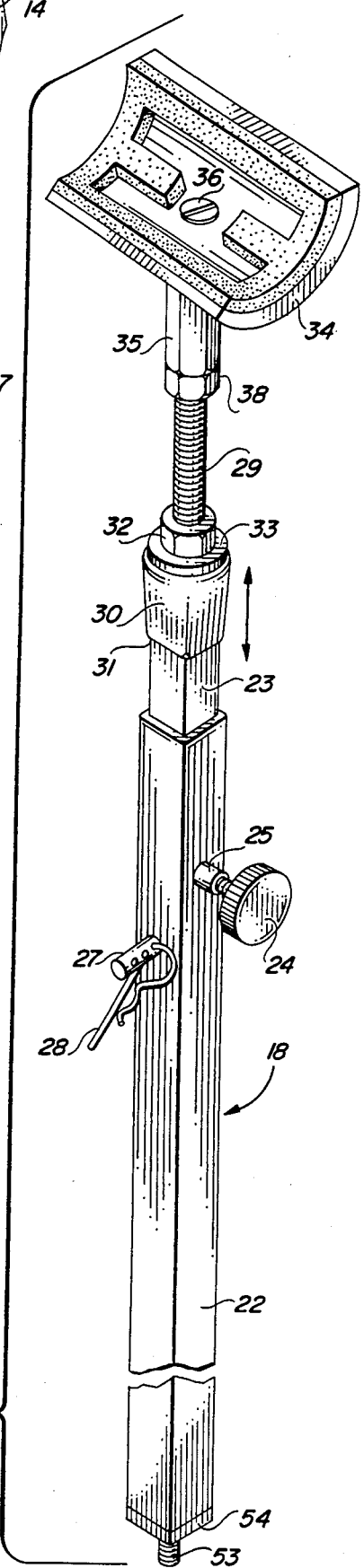

AWNING SUPPORT FOR RECREATIONAL VEHICLES

BACKGROUND OF THE INVENTION

This invention relates to awnings and more particularly to awning supports for recreational vehicles.

One of the highly prized accessories mounted on a recreational vehicle is its awning. This awning, when the vehicle is parked and it is unrolled and properly supported, adds greatly to the usable space of the vehicle and when rolled up on the outside of the vehicle when in transit, must be tightly secured to the side of the vehicle to prevent movement and wear.

Since these awnings are extensive in length and weight when rolled up against the side of the vehicle, and have been supported only at their ends, they have swayed and bounced in transit, causing extensive and premature wear and stretching of the awning material and warping of the roll bars and end supports therefor.

DESCRIPTION OF THE PRIOR ART

The prior art awnings of the 10 to 12 million recreational vehicles on the roads in the United States generally support their awnings only at their ends with some employing a tension rafter between their ends, while in parked unrolled extended position, none have employed a center truss when the awning is rolled up against the vehicle side while in transit. Thus, a need exists for readily supporting the awning with a center post at a point between its ends when the vehicle is parked and the awning extended and which center pole can be readily used to provide a dual function of holding and anchoring the awning against the body of the vehicle when in transit.

SUMMARY OF THE INVENTION

In accordance with the invention claimed, a new and improved dual purpose support is provided for supporting between its ends an unrolled edge of an awning mounted on the side of a parked recreational vehicle and clamping and holding the rolled awning to the side of the vehicle at a point between its ends when the vehicle is in transit.

It is, therefore, one object of this invention to provide a new and improved awning support.

Another object of this invention is to provide a new and improved center support for a recreational vehicle awning which support eliminates any warp in the awning when extended in vehicle parked position, and aids in firmly securing the awning when the vehicle is in transit and the awning is rolled up against and supported on the side of the vehicle.

A further object of this invention is to provide a new and improved extendable dual purpose center pole for vehicle awning for use in awning extended and rolled up positions which may be adapted to new and existing awning structures.

A still further object of this invention is to provide an improved center pole awning support which extends between the vehicle and the edge of the unrolled awning in a substantially vertical position when in transit.

Further objects and advantages of this invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings, in which:

FIG. 1 is a partial perspective view of an awning mounted on the side of a recreational vehicle and with a center pole in place and embodying the invention;

FIG. 2 is a view similar to FIG. 1 with the awning rolled up against the side of the vehicle and the center pole in another awning supporting position;

FIG. 3 is an enlarged perspective view of the center pole shown in FIGS. 1 and 2;

DESCRIPTION OF THE PREFERRED EMBODIMENT

Figure 4:
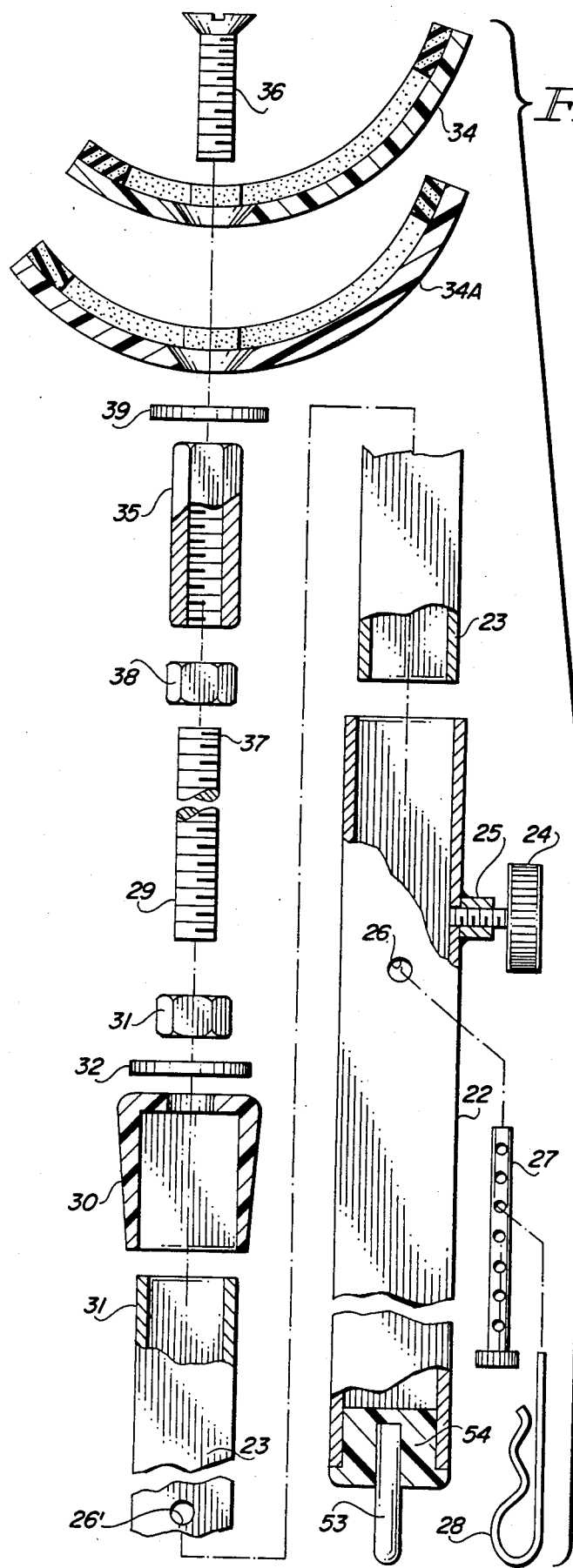
FIG. 4 is an exploded view of the various parts of the center pole shown in FIGS. 1-3 together with two awning roll engaging plates.

Referring more particularly to the drawings by characters of reference, FIGS. 1 and 2 disclose a partial view of one side of a recreational vehicle 10 having an awning 11 mounted thereon for use in its unrolled extended position as shown in FIG. 1 and its rolled up in transit position as shown in FIG. 2.

The awning may be provided with a pair of end supports 12 and 13 which are pivotally mounted to the ends of awning roll clamp 14 to which rolled up awning 11 is secured. These end supports 11 and 12 may be pivotally attached at their other ends 15 and 16 to clamps 17 positioned at one or the other of the positions shown on the side of the vehicle, as shown in FIGS. 1 and 2. The ends 15 and 16 of end supports 12 and 13 may be ground supported at a distance spaced from the vehicle and still fall within the scope of this invention.

In accordance with the invention claimed, a center pole 18 is provided for extending between a clamp attached to the side of the vehicle adjacent the clamped edge 20 of awning 11 and substantially the center of the outer edge 21 of awning 11, as shown in FIG. 1.

FIG. 2 illustrates the use of center pole 18 for supporting awning 11 in its rolled up condition during in transit movement of the vehicle, as hereinafter explained.

As shown in FIGS. 3 and 4, center pole 18 comprises a pair of telescopic tubular members 22 and 23 which may have same cross-sectional configuration which are held in various relative positions by a bolt 24 that is threaded to a collar 25 secured to the outer surface of member 22 at a point along its length, the end of which bears against the outer surface of the member 23 in a known manner. After adjustment of the center pole on the awning, one or more holes 26 may be drilled to extend through members 22 and 23 for receiving an apertured pin 27 and associated key 28 for securing the telescopic members in their relative positions.

A threaded bolt 29 is provided for threadedly fitting into a collar 30 which collar is fitted over the outer end 31 of member 23. A nut 32 and washer 33 holds bolt 29 in a given position in collar 30.

An awning engaging an arcuate shaped resiliently positioned cradle 34 is threadedly attached to one end of a cylindrical collar 35 by a bolt 36. The other end 37 of bolt 29 is threadedly attached to the hollow interior of the other end of collar 35, as shown in FIG. 3. A nut 38 and washer 39 are used to tightly position one of the cradles to bolt 29.

FIG. 4 illustrates a second cradle 34A which may be used on center pole 18 when the pole is used to support the awning in its extend position.

Figure 5:
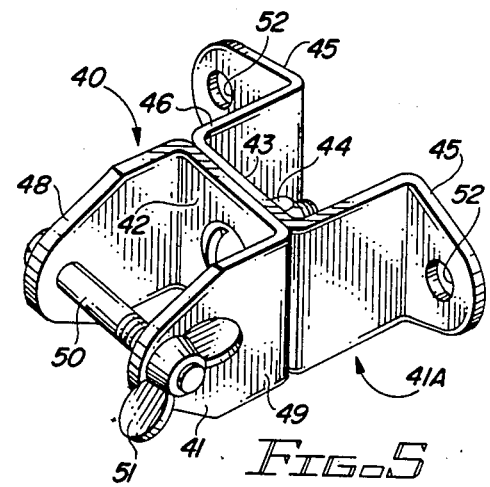
FIGS. 5 and 6 are perspective views of mounting clamps for pivotally attaching the center pole to the side of the vehicle when iin awning extended position.
Figure 6:
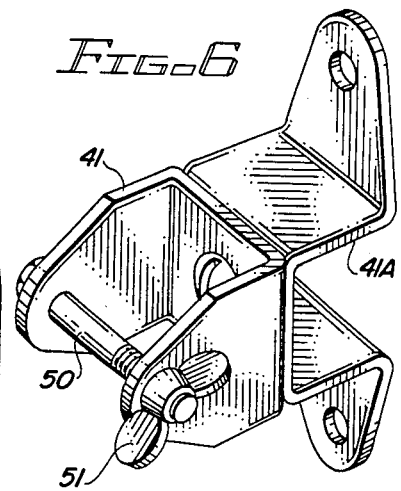
Figure 7:
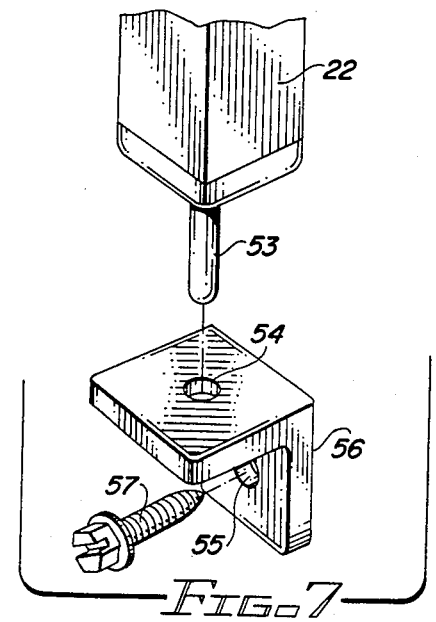
FIG. 7 is a perspective view of a clamp for holding the base of the center pole when the center pole is utilized to hold and support the awning in rolled up position during transit.

FIGS. 5, 6 and 7 illustrate various clamps for attaching the center pole to the side of the recreational vehicle.

FIG. 5 illustrates a clamp 40 comprising two U-shaped members 41 and 41A bolted together at their bites 42 and 43 by a bolt and nut arrangement 44. Member 41A is provided with a pair of feet 45, one extending diammetrically opposite to the other from opposite sides of legs 46 and 47.

The other member 41 is provided with a pair of spaced legs 48 and 49 which have a bolt 50 and an associated wing nut 51 extending therebetween and through the leg configuration in the manner shown.

This clamp forms a means for receiving between the legs 48 and 49 of member 41 with bolt 50 removed the center pole 18 for securing it to the side of the vehicle in transit when bolts or screws (not shown) pass through apertures 52 in feet 45 to fasten the clamp to the vehicle, as shown in FIG. 2.

FIG. 6 shows member 40 in a different clamping position.

It should be noted that member 41 when secured by itself to the side of the vehicle forms an anchor for the lower end of the center pole 18, as shown in FIG. 3.

FIGS. 3 and 4 illustrate that a threaded bolt or pin 53 is arranged to be seated in a cap 54 that is inserted into the tubular end of member 22. Thus, when clamp 41A is bolted to the vehicle at a point below the awning, pin 53 of center pole 18 may be inserted into the aperture formed in its bite 43 where bolt and nut arrangement 44 extended therethrough, as shown in FIGS. 4 and 5 to anchor the pin end of the center pole to the vehicle.

With the center pole having been extended to substantially the length needed to span the distance between the vehicle and edge 21 of the awning, as shown in FIG. 1, the fine adjustment needed to snugly tighten cradle 34 or 34A against the awning roll bar is accomplished by adjusting bolt 29 relative to its position in collar 30 in the usual manner. This action permits a fine adjustment necessary to tighten the awning fabric and to straighten if necessary the awning roll bar.

When the awning is rolled up in the usual manner, the center pole 18 is then positioned adjacent the wall of the vehicle with its pin 53 extending into an aperture 55 one leg of a right angle clamp 56 which is attached to the base of the vehicle with a bolt, metal or wood screw 57, or the like, extending through an aperture 55 in the other leg of clamp 56 as shown in FIG. 7.

The other end of center pole 18 with its cradle 34A or 34 is snugly engaged with the lower portion of the awning roll to place an upward pressure thereon. This action takes any wrap out of the awning and prevents it from swaying in transit.

As previously mentioned, the center pole is held against the side of the vehicle in transit by clamp 40.

Although but one embodiment of the invention has been illustrated and described, it will be apparent to those skilled in the art that various changes and modifications may be made therein without departing from the spirit of the invention or from the scope of the appended claims.

What is claimed is:

1. A dual purpose adjustable pole for use as a support for a recreational vehicle awning in extended parked position and while the vehicle is in transit comprising:
   a center pole employing a pair of telescopically arranged tubular members,
   a first means for adjustably positioning and locking said members in a given position,
   said first means comprising a collar secured to the outer surface of one of said members at a point along its length and a bolt threadedly attached to said collar and bearing at one end against the other of said members,
   said members having a plurality of axially aligned apertures extending through juxtapositioned surfaces thereof,
   said first means comprising a pin extending through said aligned apertures in said juxtapositioned surfaces of said members,
   one end of said pole being provided with a pin extending axially therefrom,
   the other end of said pole being provided with a bolt threadedly mounted at one end therein and extending axially therefrom,
   an arcuate aligned cradle threadedly secured to the other end of said bolt, and
   a second means for adjustably positioning and locking said bolt in said pole to increase and decrease selectively the length of said pole.

2. The dual purpose adjustable pole set forth in claim 1 wherein:
   said members have a square cross-sectional configuration.

3. The dual purpose adjustable pole set forth in claim 1 wherein:
   said pin is provided with a head at one end and a plurality of apertures along its length, and
   a key for extending through one of said apertures at the other end of said pin outside of said members for securing said members in a given relative position.

* * * * *